United States Patent [19]

Fournier et al.

[11] Patent Number: 5,125,164
[45] Date of Patent: Jun. 30, 1992

[54] PORTABLE AXLE AND FRAME ALIGNMENT TOOL

[75] Inventors: Jerald C. Fournier, Columbia City, Ind.; Joseph B. Casebere, Bryan, Ohio

[73] Assignee: Axle-Tru, Inc., Columbia City, Ind.

[21] Appl. No.: 581,475

[22] Filed: Sep. 12, 1990

[51] Int. Cl.⁵ .............................................. G01B 11/27
[52] U.S. Cl. ..................................... 33/608; 33/288; 33/228
[58] Field of Search ................ 33/608, 228, 288, 203.15-203.21; 356/154, 155

[56] References Cited

U.S. PATENT DOCUMENTS

| | | | |
|---|---|---|---|
| 2,573,056 | 10/1951 | Polinske | 33/288 |
| 2,590,722 | 3/1952 | Otis | |
| 2,689,403 | 9/1954 | Wilkerson | |
| 3,012,325 | 12/1961 | Elam | 33/288 |
| 3,079,695 | 3/1963 | Mineck | |
| 3,137,076 | 6/1964 | Hurst | |
| 3,162,950 | 12/1964 | Hykes | |
| 3,182,405 | 5/1965 | Taylor | |
| 3,325,905 | 6/1967 | Hurst | |
| 3,337,961 | 8/1967 | Holub | |
| 3,398,453 | 8/1968 | Hurst | |
| 3,417,479 | 12/1968 | Hirmann | |
| 3,550,277 | 12/1970 | Selnes | |
| 3,566,476 | 3/1971 | McWhorter | |
| 3,805,396 | 4/1974 | Hunnicutt | 33/608 |
| 3,810,313 | 5/1974 | Hicks | 33/288 |
| 3,962,796 | 6/1976 | Johnston | 33/288 |
| 4,006,532 | 2/1977 | Hallman | 33/288 |
| 4,015,338 | 4/1977 | Kunze et al. | 33/288 |
| 4,058,903 | 11/1977 | Wilkerson | 33/288 |
| 4,159,574 | 7/1979 | Samuelsson et al. | 33/288 |
| 4,322,890 | 4/1982 | Jarman et al. | 33/288 |
| 4,337,581 | 7/1982 | Eck | 33/288 |
| 4,413,420 | 11/1983 | Hoffman et al. | 33/203.17 |
| 4,416,065 | 11/1983 | Hunter | 33/203.15 |
| 4,439,987 | 4/1969 | Bacher et al. | 33/288 |
| 4,441,259 | 4/1984 | Leitermann et al. | 33/288 |
| 4,442,608 | 4/1984 | Clausen | 33/288 |
| 4,510,694 | 4/1985 | Boyce | 33/288 |
| 4,513,508 | 4/1985 | Jarman et al. | 33/288 |
| 4,569,140 | 2/1986 | Hobson | 33/203.18 |
| 4,577,413 | 3/1986 | Mason | 33/203.18 |
| 4,615,618 | 10/1986 | Bailey et al. | 33/288 |
| 4,630,379 | 12/1986 | Wickmann et al. | 33/288 |
| 4,690,557 | 9/1987 | Wiklund | |
| 4,726,122 | 2/1988 | Andersson | 33/288 |
| 4,856,199 | 8/1989 | Merrill et al. | 33/203.15 |
| 4,939,848 | 7/1990 | Armstrong | 33/608 |
| 4,942,667 | 7/1990 | Fournier | 33/608 |

Primary Examiner—William A. Cuchlinski, Jr.
Assistant Examiner—C. W. Fulton
Attorney, Agent, or Firm—Barnes & Thornburg

[57] ABSTRACT

A portable apparatus for aligning the axles of a tractor, a trailer, or other vehicle and for detecting bends, bows, twists amd other irregularities in vehicle frames, has a light source used to provide a reference plane from which measurements can be taken. Dual targets are attached to the underside of the vehicle frame and are used in conjunction with the light source to establish the reference plane. The light source is slidably arranged on a U-shaped frame and is positionable to project a light beam at the targets. The U-shaped frame is directly attached along the center axis of the wheel axle so that the horizontal bar on which a light support is arranged with be parallel to the wheel axle and thus provide an accurate measurement of missalignment. The U-shaped frame and dual targets are provided with features which allow both to be leveled easily. Rollers are provided on the leveling supports of the U-shaped frame to facilitate movement of the frame along the underlying surface as the axle is aligned.

17 Claims, 4 Drawing Sheets

PORTABLE AXLE AND FRAME ALIGNMENT TOOL

This specification discloses certain improvements to a portable axle and frame alignment tool which is the subject of U.S. Ser. No. 370,054 which issued on Jul. 24, 1990, as U.S. Pat. No. 4,942,667. Portions of U.S. Pat. No. 4,942,667 are repeated below. However, to the extent required for a full and complete disclosure and understanding of the present invention, U.S. Pat. No. 4,942,667 is hereby incorporated by reference into the present disclosure.

BACKGROUND AND SUMMARY OF THE INVENTION

The present invention relates to a portable apparatus for aligning the axles of a vehicle, such as a tractor or trailer, and for detecting bends, bows, twists and other irregularities in vehicle frames and other components. The invention allows mechanics to repair and replace frames and other major structural components of vehicles in the field, without the aid of special purpose, precision-leveled racks and platforms.

In a tractor-trailer combination, the trailer will sometimes fail to properly trail the tractor because of axle misalignment. This problem generally results from the axle being misaligned such that it is not perpendicular to a fore-and-aft centerline of the frame of the trailer. Similar misalignments of the rear axle(s) of the tractor can also cause problems, such as accelerated tire wear, lowered fuel economy, and increased driver fatigue.

Various methods for providing vehicle axle correction have been proposed. U.S. Pat. No. 3,566,476 to McWhorter uses a light projector attached on a support behind the wheel axle. The projector is first directed towards a rear reference point extending from the underside of the trailer frame. The projector is then tilted downwardly and the beam projected forwardly to a front reference point attached to a kingpin. The beam will supposedly miss the kingpin reference point when the axle is out of alignment. Both the kingpin reference point and the rear reference point are located on the centerline of the trailer frame. The light projector is connected on a frame to two wheel gauges which are attached around the circumference of the tire. This arrangement suffers from being sensitive to tire size and wear, the regularity of the underlying ground surface, and other factors so that an inaccurate measurement of the misalignment of the axle may result. Also, since the projector is fixed along the centerline, the most accurate measurement of misalignment may not be possible since the deviation from true alignment is greatest on the adjusting side (as opposed to the stationary side) of the vehicle axle, and the deviation will therefore be greater on the adjusting side of the centerline than at the centerline. Thus, a measurement of misalignment made on the adjusting side of the axle will allow for increased resolution, when compared to a measurement made on the centerline or on the stationary side of the axle.

In addition to the alignment of vehicle axles, mechanics who maintain and repair large vehicles, such as tractors and trailers, are often called upon to replace components of the undercarriage, straighten or rebuilt frames, and otherwise repair damage caused by road collisions, extended usage, or material failures. To properly perform such repairs often requires the use of precision leveled working surfaces or other special tools and conditions to ensure that the rebuilt or repaired vehicle is serviceable. The present invention provides an arrangement for making such repairs which is convenient and relatively inexpensive, while maintaining the required degree of precision.

An object of the present invention is to provide an apparatus for aligning wheel axles of and making other repairs to a vehicle, which apparatus is both accurate and simple to operate.

Another object of the present invention is to provide an apparatus for aligning wheel axles of and making other repairs to a vehicle, which can be used on uneven ground.

Yet another object of the present invention is to provide such a device which is portable and which can be used in various surroundings and under various conditions.

A further object of the present invention is to provide a device which measures directly from the central axis of the wheel axle so that irregularities in the ground surface do not affect the measurement of wheel axle alignment.

A further object of the present invention is to provide a device for establishing a reference plane underneath the frame of a tractor or trailer so that measurements can be made between this reference plane and the vehicle, for providing an indication of irregularities in the frame of the vehicle.

A still further object of the present invention is to provide means for accurately and efficiently leveling the reference plane under the vehicle to increase the utility and improve the operation of the invention in particular situations.

These and other objects of the present invention are achieved in a device for establishing a reference plane with respect to a vehicle frame from which measurements relating to the vehicle can be made and which includes a first target assembly attachable to the underside of the vehicle frame. This first target assembly has at least two targets spaced apart on a first line which is substantially transverse to the vehicle frame. The individual targets of the assembly are spaced an equal vertical distance from the underside of the frame. A second target assembly, which is attachable to the underside of the vehicle frame, also has at least two targets spaced apart on a second line which is substantially transverse to the vehicle frame. Each of these individual targets are also spaced the same vertical distance from the underside of the vehicle frame, and these targets are provided with openings for allowing a light beam to pass through. A light source directs a beam of light through an individual target of the second target assembly toward a corresponding target on the first assembly. This light source is positionable along a line that is substantially transverse to the vehicle frame.

An advantage of this embodiment of the present invention is that a reference plane is established with respect to a vehicle frame by the multiple targets on the target assemblies. From this reference plane, measurements can be made to various points on the underside of the vehicle frame to detect irregularities, so that steps can be taken to correct these irregularities. A light source, which is positionable along a line substantially transverse to the vehicle frame, is used in combination with the multiple targets to define the reference plane beneath the vehicle so as to allow measurements to be made relative to the frame at any point.

Advantageous features are achieved by certain preferred embodiments of the present invention which include a U-shaped frame having a horizontal bar and two upright portions extending from the bar at right angles thereto. The upright portions include means for attaching the U-shaped frame to a central axis of the axle such that the horizontal bar is parallel to the central axis. A first target assembly is attachable to an underside of the vehicle, and has at least two targets spaced apart on a first line substantially transverse to the long axis of the vehicle and spaced an equal vertical distance from the underside of the vehicle. A second target assembly, which is also attachable to the underside of the vehicle, has at least two targets spaced apart on a second line substantially transverse to the long axis of the vehicle. The targets on the second target assembly are each spaced the same vertical distance from the vehicle underside, and are provided with openings for allowing a light beam to pass through the targets. Finally, a light source, for generating a beam of light, is slidably mounted on the horizontal bar of the U-shaped frame. This light source is slidably positionable to a plurality of points along the horizontal bar.

In the arrangements according to these preferred embodiments, very accurate alignment is provided since each of the target assemblies includes at least two targets so that the alignment can be measured at the adjusting side of the axle, as opposed to the center or stationary side of the axle. Since the axle effectively "pivots" about the stationary side, any deviation from perfect alignment at the adjusting side will be greater than at the center and still greater than at the stationary side, and thus, easier to detect and correct.

Certain improvements to the target assemblies and U-shaped frame originally disclosed have been made and are described in detail below. These improvements include provision of an adjustment mechanism in the target assemblies which allows the two targets of each assembly to be leveled to each other. Leveling the targets of the target assembly accounts for variations which may exist due to tire variations (i.e., different sizes and/or differing degrees of wear), weak spring arch, uneven floor surfaces, or combinations of these and other factors. Previously, some degree of leveling was attained by the use of shims placed under the pins at their point of contact with the vehicle frame, and a small carpenter's level carried by the technician. This procedure was costly in terms of time and difficulty due, at least in part, to the minimal physical clearance available to the technician in positioning shims between the vehicle frame and the pins on the target assembly. To alleviate this problem, and to allow for more precise and exact adjustments to be made, the vertical arms which support the target assembly were split into two portions connected by a guide pin and thumb screw adjusting arrangement which allows the overall length of one or both of the arms to be adjusted. A bubble level is attached to the horizontal bar to more efficiently provide an indication that the targets of the assembly have been leveled during the set-up procedure.

Improvements to the U-shaped frame are intended to decrease the set-up time and increase the functional life of the frame. In some instances, the U-shaped frame rests on the underlying surface behind the rear axle when the centering elements are positioned against the ends of the axle. In some instances where the underlying surface is uneven, the U-shaped frame may tend to bind or distort unless properly shimmed or supported. Furthermore, when the axle is adjusted, the U-shaped frame must move with the axle in order to maintain proper alignment. The resistance to movement of the U-shaped frame may be great, depending upon the points of contact and the nature of the particular surfaces involved. Such resistance to movement may cause wear on the contacting surfaces of the frame and on the centering device bearing surfaces. To address these problems, threaded members have been attached to the horizontal bar of the U-shaped frame. Heavy threaded rods extend through these members to adjustably support the U-shaped frame above the underlying surface. Rollers are provided on the bottom of the rods immediately adjacent the underlying surface to reduce the resistance to movement of the U-shaped frame. A knob or handle is provided on the opposing end of each of the rods to facilitate adjustments.

Other objects, features, and advantages of the present invention will become more apparent from the following description when taken with the accompanying drawings which show, for purposes of illustration only, preferred embodiments in accordance with the present invention.

DETAILED DESCRIPTION OF THE DRAWINGS

Figure 1:
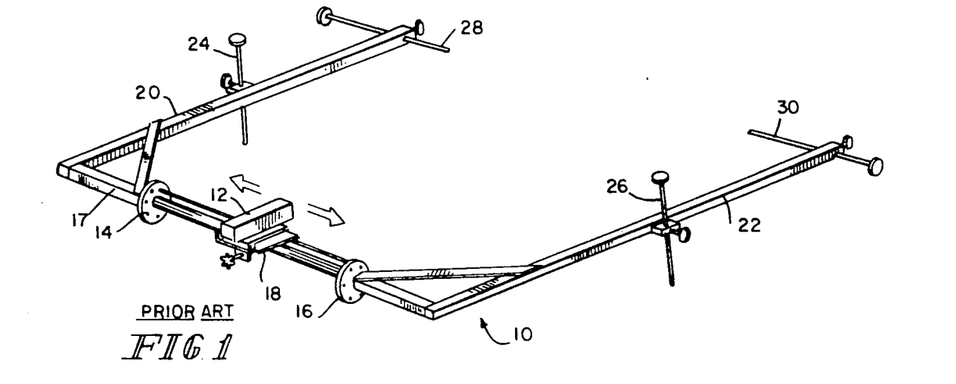
FIG. 1 is a perspective view of a U-shaped frame constructed in accordance with a preferred embodiment of the present invention.
Figures 2, 2A, 2B, 3:
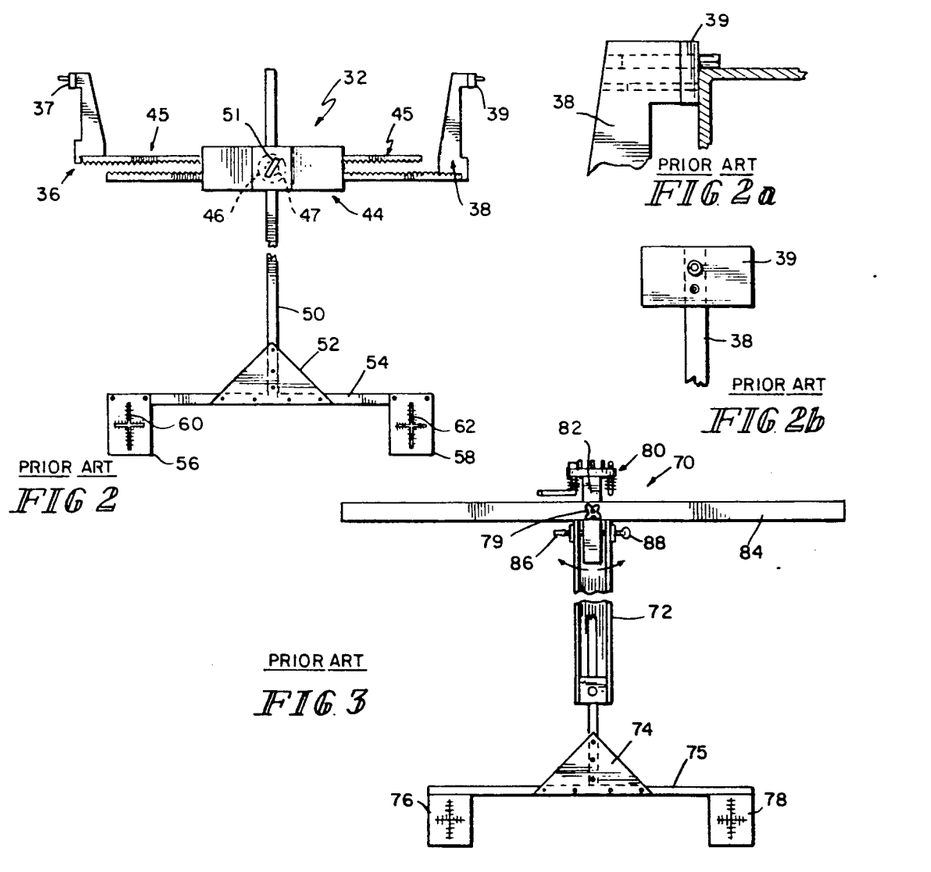
FIG. 2 is a front view of a rear target assembly constructed in accordance with a preferred embodiment of the present invention.
FIGS. 2a and 2b show additional detail of the portion of the rear target assembly which is used to suspend the assembly from a vehicle frame.
FIG. 3 is a front view of a front target assembly constructed in accordance with a preferred embodiment of the present invention.

The major components of a preferred embodiment of the apparatus are shown separately in FIGS. 1-3, as attached and used to perform measurements on a vehicle in FIGS. 4-7.

The first major component of the apparatus is shown in FIG. 1 and is a U-shaped frame 10 upon which is mounted a light projector, such as a laser 12. Laser 12 is slidably mounted on frame 10, and is adjustable in the horizontal direction between stops 14 and 16. Stops 14 and 16 are spaced approximately five feet apart which allows laser 12 to define a reference plane which projects beyond the frame rails of most vehicles (frame rails are typically spaced on 32"–42" centers). A hinge 18 on which laser 12 is mounted allows laser 12 to be adjusted (tilted) in the vertical direction. Rigidly attached to horizontal bar 17 on which hinge 18 and laser 12 are mounted, are upright portions 20 and 22 which are rigidly fixed at right angles to horizontal bar 17. Adjustable support elements 24 and 26 are attached to upright portions 20 and 22 to provide vertical support when upright portions 20 and 22 are attached to a wheel axle (See FIGS. 4–6). Also attached to upright portions 20 and 22 are centering elements 28 and 30, whose structure and function is described in more detail below.

Rear target assembly 32 is shown in FIG. 2 and comprises the next major component of the apparatus. Upwardly extending arms 36 and 38 are horizontally adjustable by means of double rack assembly 44. Racks 45 are adjustable by means of a knob 46 (dashed lines) on the rear side of the assembly which is connected to gear 47 (dashed lines) positioned between racks 45. Blocks 37 and 39, which have a long axis extending into the paper in the FIG. 2 illustration, are provided to assure squareness of target assembly 32 to the vehicle frame. Blocks 37 and 39 are preferably attached to upright arms 36 and 38 by two rolled pins, one of which is allowed to project approximately ¼–½ inch from the blocks to provide a support surface (i.e., the underside of the projecting pin) for suspending target assembly 32 from the vehicle frame (see FIG. 2(b)). Racks 45 are adjusted to press the vertical surfaces of blocks 37 and 39 tightly against a vertical surface of the vehicle frame, causing target assembly 32 to "self-adjust" to a perpendicular relationship with the longitudinal axis of the vehicle frame. A vertical bar 50 extends downwardly from rack assembly 44 and is vertically adjusted by knob 51. At the bottom of vertical bar 50 is a triangular plate 52. Attached to triangular plate 52, at a right angle to vertical bar 50, is horizontal bar 54. At the ends of horizontal bar 54 are targets 56 and 58 which have slots 60 and 62 therein.

The last major component of this preferred embodiment is a front plate target assembly 70 shown in FIG. 3. Target assembly 70 includes a vertical bar 72 extending downwardly from a first horizontal bar 84. Horizontal bar 84 is connected at a right angle to the top of vertical bar 72. A second horizontal bar 75 is connected at a right angle to the bottom of vertical bar 72 by triangle 74. Attached at both ends of second horizontal bar 75 are targets 76 and 78. Horizontal bar 75 is vertically adjustable to various positions and is held in that position by a clamping knob 79. A kingpin attachment device 80 for attaching front target assembly 70 to the kingpin of a trailer is attached to vertical member 82. Member 82 is pivotably connected to horizontal bar 84 and can be adjusted, relative to bar 84, by set screws 86 and 88 which are mounted to and extend through a portion of vertical bar 72. This arrangement allows horizontal bar 84, and consequently horizontal bar 75, to be adjusted so as to be parallel to the kingpin plate when target assembly 70 is suspended from the kingpin. It is also contemplated to provide means for attaching this target assembly to a part of the frame other than the kingpin, such as the frame rails or the kingpin plate, although attachment to the kingpin is preferred.

Figure 4:
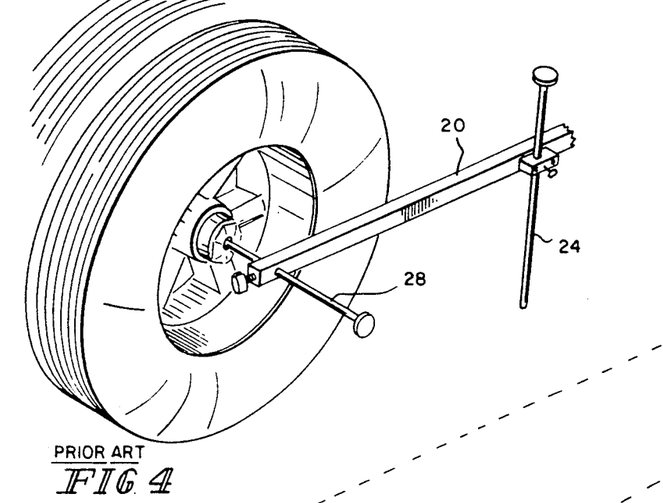
FIG. 4 is a perspective view showing a portion of the U-shaped frame of FIG. 1 connected to a vehicle wheel.

The arrangement for attaching and using target assemblies 32 and 70 and U-shaped frame 10 with a truck frame is shown in FIGS. 4–7. The U-shaped frame 10 is attached directly to the center of the wheel axle at its upright portions 20 and 22 by centering elements 28 and 30, as shown in FIG. 4. Centering elements 28 and 30 extend through upright portions 20 and 22 at right angles.

Centering elements 28 and 30 are at right angles to upright portions 20 and 22, and upright portions 20 and 22 are at right angles to horizontal bar 17. Thus, it is readily apparent that attachment of centering elements 28 and 30 to the center axis of the wheel axle will assure that horizontal bar 17 will be in a parallel relationship to the center axis of the wheel axle. Due to the rigidity of U-shaped frame 10, horizontal bar 17 will maintain this parallel relationship. It is important to note that centering elements 28 and 30 are attached directly to the center axis of the wheel axle. This is best accomplished by locating the conically-shaped depressions in the ends of the axle which are used to center the axle in a lathe during the axle manufacturing operation. The ends of centering elements 28 and 30 are conically-shaped and mate with the depressions in the axle ends to cause horizontal bar 17 to be precisely aligned and parallel with the exact center axis of the axle. This technique is believed to be much more accurate than other techniques such as that described in U.S. Pat. No. 3,566,476 to McWhorter which is discussed above.

Figure 5:
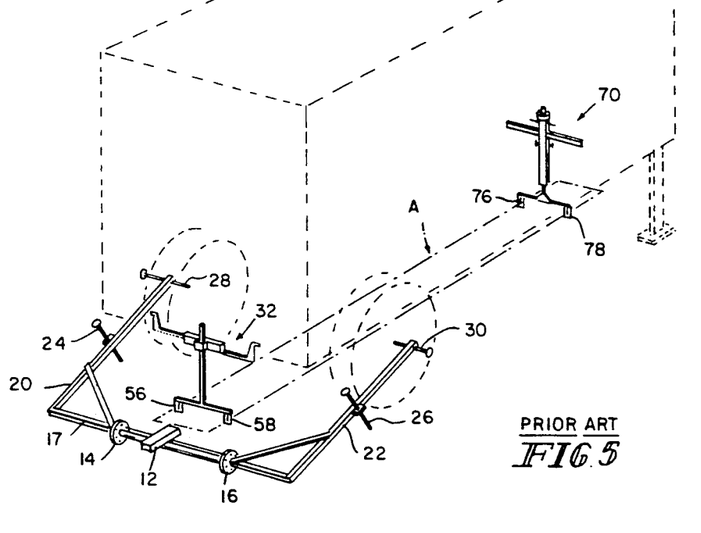
FIG. 5 is a schematic, perspective view of the arrangement of the apparatus of FIGS. 1-3 attached to a trailer frame.

Rear target assembly 32 is preferably attached to the frame rails of the vehicle. Racks 44 are extended so that the upwardly extending arms 36 and 38 will support target assembly 32. Blocks 37 and 39 are positioned to abut the frame rails so that targets 56 and 58 will be aligned along a line which is transverse to the trailer frame. Similarly, front target assembly 70 is attached to the kingpin plate by attachment device 80 and its dual targets 76 and 78 are also aligned along a line transverse to the trailer frame. This alignment may be accomplished by measuring and comparing the distances from each end of horizontal bar 84 to the front end of the kingpin plate or trailer frame.

The horizontal distance between targets 56 and 58 and between targets 76 and 78 are exactly equal. The vertical distances between each of the target pairs and the underside of the frame are also adjusted so that the respective targets lie in a plane which is parallel to the plane of the vehicle frame. In the illustrated embodiment, the back rail of the trailer box and the kingpin plate can be used as reference points for attaching the target assemblies since, during construction of the trailer frame, the kingpin plate and the back rail are placed in a jig and squared to each other, followed by construction of the rest of the trailer frame around these elements. In this way, a constant and desired spatial orientation between the kingpin plate and the back rail is assured, and thus, the alignment of the targets along lines transverse to the trailer frame and the presence of the four targets in a common plane are also assured.

FIG. 5 shows the establishment of a reference plane A by the use of the apparatus of the present invention. Laser 12 moves between stops 14 and 16 to a first position such that the light beam will project through target 56 of rear target assembly 32 onto target 76 of front target assembly 70. Laser 12 is then moved along horizontal bar 17 so that the light beam will project through target 58 onto target 78 of front target assembly 70. Since all four targets are positioned in the same plane, which is preferably parallel to the plane defined by the kingpin plate, reference plane A will also be parallel to the kingpin plate. Adjustable support elements 24 and 26 can be used to correct any angular inclination of horizontal bar 17 which might cause angling of the plane defined by laser 12 as it moves along horizontal bar 17.

Figure 6:
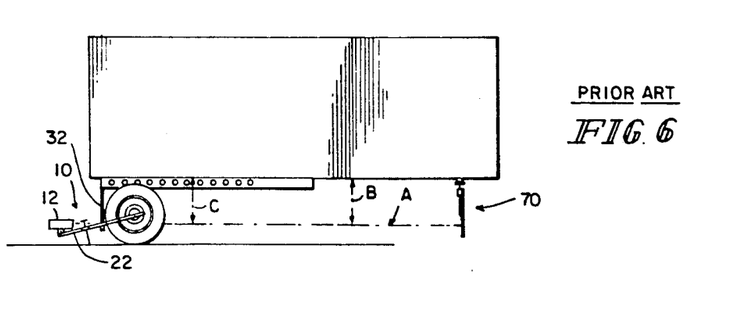
FIG. 6 is a side view of a trailer with a reference plane established underneath.

FIG. 6 illustrates the means for checking the truck frame for irregularities with the use of established reference plane A. After reference plane A has been established, a simple gauge is held against the bottom of the frame so that the light projected from laser 12 will impinge upon it, and the point of impingement on the gauge is noted. This is illustrated, by way of example, at point B in FIG. 6. The gauge is then moved to point C and the measurement is repeated. If the truck frame has been bowed, light from laser 12 will impinge upon a different location on the gauge, and the extent and degree of the irregularity (i.e., the bow) can be noted. Similar measurements relative to the reference plane will detect the degree of arch in the trailer floor and the degree of bend, twist or other irregularities in the frame elements of the vehicle. Measurements from the reference plane can also be used to locate and replace undercarriage components with precision and accuracy.

Figure 7:
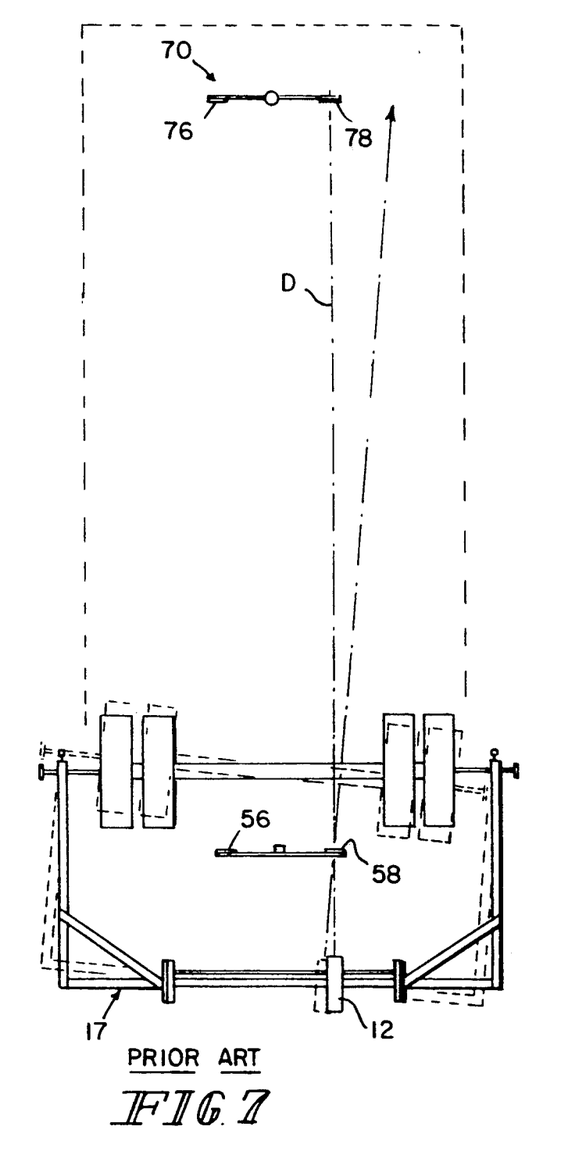
FIG. 7 illustrates a manner of using the apparatus of the present invention.

The use of this preferred embodiment of the apparatus to align a wheel axle is described with respect to FIG. 7. A correctly aligned axle, with the U-shaped frame of the present invention attached, is shown in solid lines, while an exaggeratedly misaligned axle, with U-shaped frame attached, is shown in dashed lines. When the axle is aligned properly, laser 12 will project through targets 56 and 58 to impinge upon targets 76 and 78, respectively. However, when the wheel axle is misaligned, horizontal bar 17 will be at exactly the same angle to the central longitudinal axis of the trailer frame as is the wheel axle. As can be seen from FIG. 7, light projected through either or both of targets 56 and 58 along projection line D may miss targets 76 and 78 altogether if the degree of misalignment is great. The degree of axle misalignment will in reality be less than is illustrated, so that rather than missing the entire targets 76 or 78, light beam D will miss a centering mark on target 78 which will indicate the presence and degree of misalignment.

The rear axles on a trailer unit are typically mounted in a frame arrangement to form a unit which is referred to as the slider. This unit rides on rails underneath the rear of the trailer box, and can be positioned in several for and aft positions depending upon the weight and distribution of cargo in the trailer box. One end of the axle arrangement is typically mounted in a relatively rigid and fixed manner to one side of the slider, although a certain amount of pivotable movement around the fixed mount is contemplated. The other side of the axle is mounted to the slider by means of an adjusting mechanism, such as a turn buckle, to allow that side of the axle to be moved in the for and aft direction. This allows a means for adjusting the transversely oriented axle axis relative to the longitudinal axis of the trailer.

As previously described, U-shaped frame 10 is mounted directly to the centers of the respective ends of the wheel axle. Horizontal bar 17 is thus parallel to the wheel axle. By adjusting the alignment of the wheel axis, horizontal bar 17 will also become parallel to the targets 56, 58 and 76, 78 so that when light beam D is projected through targets 56 and 58 onto targets 76 and 78, light beam D will impinge upon the centering mark on both targets 76 and 78, thereby indicating proper alignment of the axle.

Figures 8, 9, 10, 11, 12:
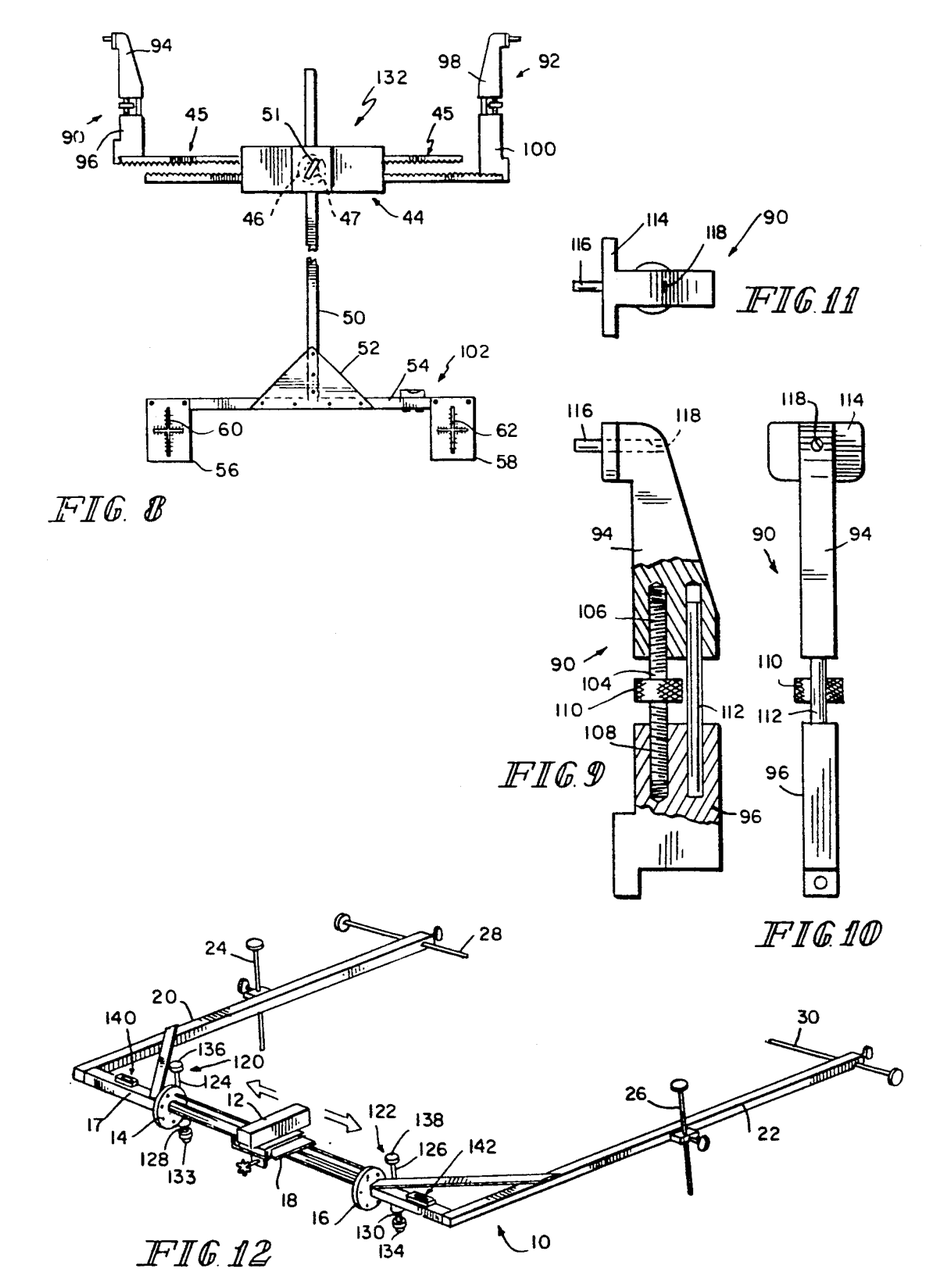
FIG. 8 is a front view of an alternative embodiment of a rear target assembly which incorporates certain improvements in accordance with the present invention.
FIG. 9 is a front view of an adjustable arm of the type used on the target assembly of FIG. 8.
FIG. 10 is a side view of the arm of FIG. 9.
FIG. 11 is a top view of the arm of FIG. 9.
FIG. 12 is a perspective view of an improved embodiment of a U-shaped frame constructed in accordance with the present invention.

FIG. 8 shows a rear target assembly 132 which incorporates certain improvements in accordance with the present invention. Where appropriate, common elements of rear target assembly 32 of FIG. 2 and target assembly 132 of FIG. 8 are identified with the same reference numerals. Accordingly, the above description of the structure and operation of rear target assembly 32 is equally applicable to target assembly 132, unless otherwise indicated below.

In addition to the elements discussed above, target assembly 132 comprises upwardly extending vertical arms 90 and 92 which serve as means for attaching target assembly 132 to the underside of a vehicle. However, unlike upwardly extending arms 36 and 38 of FIG. 2, arms 90 and 92 are split into two portions 94, 96 and 98, 100, respectively. The two portions of arms 90 and 92 are connected by an arrangement which allows each of the arms to be adjusted in overall length so that, after target assembly 132 has been suspended from the underside of a vehicle, targets 56 and 58 may be leveled by adjusting the overall length(s) of either or both of arms 90 and 92. To facilitate the leveling operation, a level indicating device may be mounted to the target assembly. This feature is illustrated in target assembly 132 as a bubble level assembly 102 which is mounted on horizontal bar 54.

FIG. 9 snows an enlarged view or arm 90 which illustrates, in detail, a preferred form of the length adjusting mechanism. This mechanism includes a threaded element 104 which is attached to portion 94 by, for example, left-hand threads 106, and to portion 96 by, for example, right-hand threads 108. A thumb screw 110 is fixedly attached to element 104 to allow the element to be turned so as to adjust the gap separating portions 94 and 96. This arrangement allows the overall length of arm 90 to be conveniently and precisely adjusted.

In addition to threaded element 104, portions 94 and 96 are connected by a guide pin 112. Pin 112 prevents portions 94 and 96 from rotating relative to one another, and otherwise serves to maintain alignment of the two portions during length adjustments.

FIGS. 10 and 11 show side and top views, respectively, of arm 90. These views illustrate another difference in design from that illustrated above in connection with arms 36 and 38. On arm 38, for example, a block 39 is provided as illustrated in FIGS. 2a and 2b. Block 39 is mounted to arm 38 by two roll pins, one of which extends outwardly from the block and serves to support target assembly 32 relative to a vehicle frame. Arm 90, on the other hand, is provided with an integrally formed portion 114 which is the functional equivalent of block 39. A single roll pin or dowel 116 is provided in a single hole 118, as illustrated in FIGS. 9-11.

FIG. 12 shows another improvement in the present invention which has been incorporated into U-shaped frame 10 of FIG. 1. The improvement comprises the addition of leveling supports 120 and 122 attached to horizontal bar 17 in the vicinity of stops 14 and 16. Leveling supports 120 and 122 comprise tubular bodies 124 and 126 having internal threads which receive threaded members 128 and 130, respectively. Attached to the ends of threaded members 128 and 130 are rollers 133 and 134. These rollers allow frame 10 and horizontal bar 17 to be more easily moved and maintained in alignment with the axle of the vehicle as the axis is adjusted relative to the vehicle frame in the alignment process.

Knobs 136 and 138 are attached to the ends of threaded members 128 and 130 to facilitate the leveling process. After frame 10 has been positioned with respect to the vehicle as described above, knobs 136 and 138 are turned so as to adjust the vertical positioning of and so as to level horizontal bar 17. As the axis is moved into alignment, as described above, rollers 133 and 134 allow frame 10 to more easily maintain proper positioning relative to the vehicle axle.

Although the present invention has been described and illustrated in detail, it is to be clearly understood that the same is by way of illustration and example only, and is not to be taken by way of limitation. The spirit and scope of the present invention are to be limited only by the terms of the intended claims.

What is claimed is:

1. In an apparatus for detecting defects in the alignment of an axle with a frame of a vehicle, and for detecting deformities in the frame, said apparatus comprising a light source movable mounted adjacent the vehicle for projecting a light beam underneath the vehicle, and at least one target assembly cooperating with the light beam projected by the light source, said target assembly comprising a generally vertical member having first and second ends, means for attaching the first end of the vertical member to the underside of the vehicle, a generally horizontal member attached to the second end of the vertical member, and at least two targets mounted to and spaced apart on said horizontal member, the improvement wherein said means for attaching the first end of the vertical member to the underside of the vehicle comprises a second generally horizontal member attached to the first end of the vertical member and extending adjacent a portion of the underside of the vehicle, and a pair of generally vertical arms extending upwardly from said second generally horizontal member and being attachable to the underside of the vehicle, and means for adjusting the overall length of at least one of said generally vertical arms so as to allow the targets mounted to the generally horizontal member to be leveled.

2. An apparatus according to claim 1, wherein said at least one generally vertical arm is split into at least two portions, and wherein said portions are connected by threaded means for adjusting the overall length of said arm.

3. An apparatus according to claim 1, wherein said at least one generally vertical arm is split into at least two portions, and wherein said portions are connected by a threaded element having right-hand threads extending into one of said portions and left-hand threads extending into the other of said portions, and wherein said portions are further connected by a guide pin.

4. An apparatus according to claim 1, further comprising level indicating means integrally mounted to said target assembly.

5. An apparatus according to claim 4, wherein said level indicating means comprises a bubble level assembly mounted to said generally horizontal member.

6. An apparatus for detecting defects in the alignment of an axle with a frame of a vehicle, and for detecting deformities in said frame, the apparatus comprising:

a first target assembly attachable to an underside of said vehicle, said first target assembly comprising a first generally vertical member having first and second ends, means for attaching the first end of the vertical member to the underside of the vehicle, a first generally horizontal member attached to the second end of the first vertical member, and at least two targets mounted to said first generally horizontal member and spaced apart on a first line substantially transverse to a longitudinal axis of the vehicle;

a second target assembly attached to said underside, said second target assembly comprising a second generally vertical member having first and second ends, means for attaching the first end of the vertical member to the underside of the vehicle, a second generally horizontal member attached to the second end of the second vertical member, and at least two targets mounted to said second generally horizontal member and spaced apart on a second line substantially transverse to said longitudinal axis of the vehicle, said second target assembly targets each having an opening;

a horizontal bar positioned beyond the second target assembly;

means for aligning the horizontal bar along an axis that is parallel to the axle of said vehicle;

a light source means for generating a beam of light, the light source means being slidably mounted on the horizontal bar and moveable between a first position where the light beam projects through one of the second targets toward a corresponding one of the first targets to a second position where the light beam projects through the other of the second targets toward a corresponding other of the first targets; and leveling support means, attached to the horizontal bar, for leveling and supporting the horizontal bar above an underlying surface, said leveling support means comprising at least two support members, at least one of which is adjustable in length to allow the horizontal bar to be leveled, and means for reducing resistance to movement of the horizontal bar relative to the underlying surface such that the horizontal bar may be more easily maintained in parallel alignment with the axle of the vehicle as the axle is adjusted relative to the vehicle frame.

7. An apparatus according to claim 6, wherein said means for reducing resistance to movement of the horizontal bar comprises roller means for contacting the underlying surface so as to allow the horizontal bar to be rolled over said surface.

8. An apparatus according to claim 7, wherein said leveling support means comprises a threaded rod attached to the horizontal bar, and wherein said roller means is attached to the threaded rod.

9. An apparatus according to claim 6, wherein said means for attaching the first ends of the first and second vertical members of the first and second target assemblies to the underside of the vehicle comprises adjustment means for adjusting said target assembly relative to the underside of the vehicle such that said targets mounted to said first and second horizontal members may be leveled.

10. An apparatus according to claim 9, wherein said means for attaching each of said first ends of said first and second vertical members of the target assemblies to the underside of the vehicle comprises a pair of upwardly extending arms attachable to the underside of the vehicle, at least one of said arms being adjustable in length so as to allow the targets to be leveled.

11. An apparatus according to claim 10, wherein said at least one upwardly extending arm is split into two portions connected by a threaded member to allow the overall length of the arm to be adjusted.

12. An apparatus according to claim 10, wherein said at least one generally vertical arm is split into at least two portions, and wherein said portions are connected by a threaded element having right-hand threads extending into one of said portions and left-hand threads extending into the other of said portions, and wherein said portions are further connected by a guide pin.

13. An apparatus according to claim 9, further comprising level indicating means integrally mounted to said target assembly.

14. An apparatus according to claim 13, wherein said level indicating means comprises a bubble level assembly mounted to said generally horizontal member.

15. An apparatus for detecting defects in the alignment of an axle with a frame of a vehicle, and for detecting deformities in said frame, the apparatus comprising:

a first target assembly attachable to an underside of said vehicle, said first target assembly comprising a first generally vertical member having first and second ends, means for attaching the first end of the vertical member to the underside of the vehicle, a first generally horizontal member attached to the second end of the first vertical member, and at least two targets mounted to said first generally horizontal member and spaced apart on a first line substantially transverse to a longitudinal axis of the vehicle;

a second target assembly attached to said underside, said second target assembly comprising a second generally vertical member having first and second ends, means for attaching the first end of the vertical member to the underside of the vehicle, a second generally horizontal member attached to the second end of the second vertical member, and at least two targets mounted to said second generally horizontal member and spaced apart on a second line substantially transverse to said longitudinal axis of the vehicle, said second target assembly targets each having an opening;

a horizontal bar positioned beyond the second target assembly;

means for aligning the horizontal bar along an axis that is parallel to the axle of said vehicle;

a light source means for generating a beam of light, the light source means being slidably mounted on the horizontal bar and moveable between a first position where the light beam projects through one of the second targets toward a corresponding one of the first targets to a second position where the light beam projects through the other of the second targets toward a corresponding other of the first targets; and leveling support means, attached to the horizontal bar, leveling and supporting the horizontal bar above an underlying surface.

16. An apparatus according to claim 15, wherein said leveling support means comprises leveling means for leveling said horizontal bar over said underlying surface, and roller means, attached to said leveling means, for contacting said underlying surface and for reducing the resistance to movement of the horizontal bar relative to said surface.

17. An apparatus according to claim 16, wherein said leveling means comprises a threaded rod attached to the horizontal bar, and wherein said roller means is attached to the threaded rod.

* * * * *